United States Patent
Steinberger et al.

(10) Patent No.: US 9,709,147 B2
(45) Date of Patent: Jul. 18, 2017

(54) HYBRID DRIVE MODULE WITH SINGLE DAMPER

(71) Applicant: Schaeffler Technologies AG & Co. KG, Herzogenaurach (DE)

(72) Inventors: Markus Steinberger, Macedonia, OH (US); Matthew Payne, Glenmont, OH (US); Michael G. Swank, Shreve, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 62 days.

(21) Appl. No.: 14/847,774

(22) Filed: Sep. 8, 2015

(65) Prior Publication Data

US 2016/0084363 A1  Mar. 24, 2016

Related U.S. Application Data

(60) Provisional application No. 62/053,556, filed on Sep. 22, 2014.

(51) Int. Cl.
*F16H 45/00* (2006.01)
*F16H 45/02* (2006.01)
(Continued)

(52) U.S. Cl.
CPC .............. *F16H 45/02* (2013.01); *B60K 6/00* (2013.01); *B60K 6/38* (2013.01); *B60K 6/40* (2013.01);
(Continued)

(58) Field of Classification Search
CPC ... B60K 6/20; B60K 6/22; B60K 6/38; B60K 6/383; B60K 6/387; B60K 6/40;
(Continued)

(56) References Cited

U.S. PATENT DOCUMENTS 6,340,339 B1 * 1/2002 Tabata ............... B60K 6/26
180/65.26
2005/0133328 A1  6/2005 Masuya
(Continued)

FOREIGN PATENT DOCUMENTS

JP  2010120543  6/2010
JP  2011131619  7/2011

*Primary Examiner* — Richard Lorence
(74) *Attorney, Agent, or Firm* — Chester Paul Maliszewski (57) ABSTRACT

A hybrid drive module, including: a torque converter with an output shaft, a cover for connection to a flex plate for an internal combustion engine, an impeller non-rotatably connected to the cover, a turbine, and a torsional damper including an input part non-rotatably connected to the turbine, an output part non-rotatably connected to the output shaft, and at least one circumferentially aligned coil spring engaged with the input part and output parts; an output hub arranged to non-rotatably connect to a transmission input shaft; and a disconnect clutch assembly including a first clutch component non-rotatably connected to the output hub and arranged to non-rotatably connect to an electric motor and a second clutch component non-rotatably connected to the output shaft. A torque path from the cover to the output hub passes through in sequence: the turbine, the damper, the output shaft, the second clutch component, and the first clutch component.

20 Claims, 10 Drawing Sheets

(51) Int. Cl.
 *B60K 6/38* (2007.10)
 *B60K 6/40* (2007.10)
 *B60K 6/00* (2006.01)

(52) U.S. Cl.
 CPC ....... F16H 45/00 (2013.01); *F16H 2045/005* (2013.01); *F16H 2045/007* (2013.01); *F16H 2045/0205* (2013.01); *F16H 2045/0221* (2013.01); *F16H 2045/0278* (2013.01); *Y02T 10/6221* (2013.01)

(58) Field of Classification Search
 CPC ... B60K 6/48; Y02T 10/6221; Y10S 903/951; F16H 2045/005; F16H 2045/007; F16H 45/02; F16H 2045/0205; F16H 2045/0221; F16H 2045/0278
 See application file for complete search history.

(56) References Cited

U.S. PATENT DOCUMENTS

| | | | |
|---|---|---|---|
| 2006/0289209 A1* | 12/2006 | Grosspietsch | B60K 6/26 180/65.25 |
| 2010/0081540 A1* | 4/2010 | Krause | B60K 6/405 477/3 |
| 2012/0258838 A1 | 10/2012 | Hartz et al. | |
| 2013/0086897 A1* | 4/2013 | Frait | B60K 6/387 60/338 |
| 2013/0087225 A1 | 4/2013 | Frait et al. | |
| 2013/0192946 A1 | 8/2013 | Frait et al. | |
| 2013/0192947 A1 | 8/2013 | Frait et al. | |
| 2013/0284554 A1 | 10/2013 | Ideshio et al. | |

\* cited by examiner

HYBRID DRIVE MODULE WITH SINGLE DAMPER

CROSS-REFERENCE TO RELATED APPLICATIONS

This application claims the benefit under 35 U.S.C. §119 (e) of U.S. Provisional Patent Application No. 62/053,556, filed Sep. 22, 2014, which application is incorporated herein by reference in its entirety.

TECHNICAL FIELD

The present disclosure relates to a hybrid drive module accepting torque from an internal combustion engine and an electric motor. The hybrid drive module includes a torque converter and a disconnect clutch assembly for controlling the torque at an output for the hybrid drive module. The only torsional vibration damper between the internal combustion engine and the output is a torsional vibration damper in the torque converter.

BACKGROUND

Figure 8A:
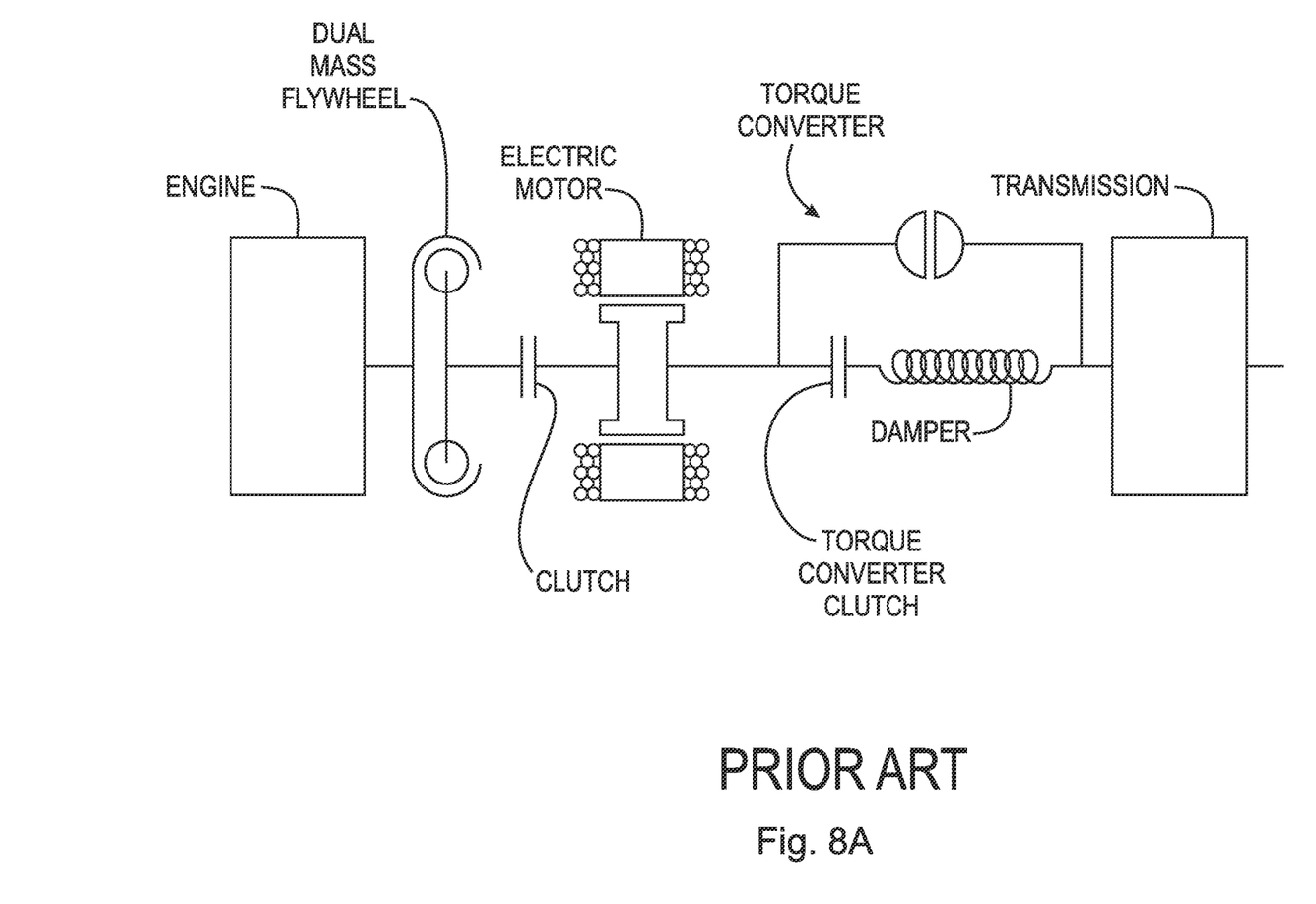
FIGS. 8A and 8B are schematic block diagrams of prior art drive trains including a hybrid drive module; and, FIG. 9 is a partial cross-sectional view of a prior art drive train including a hybrid drive module.
Figure 8B:
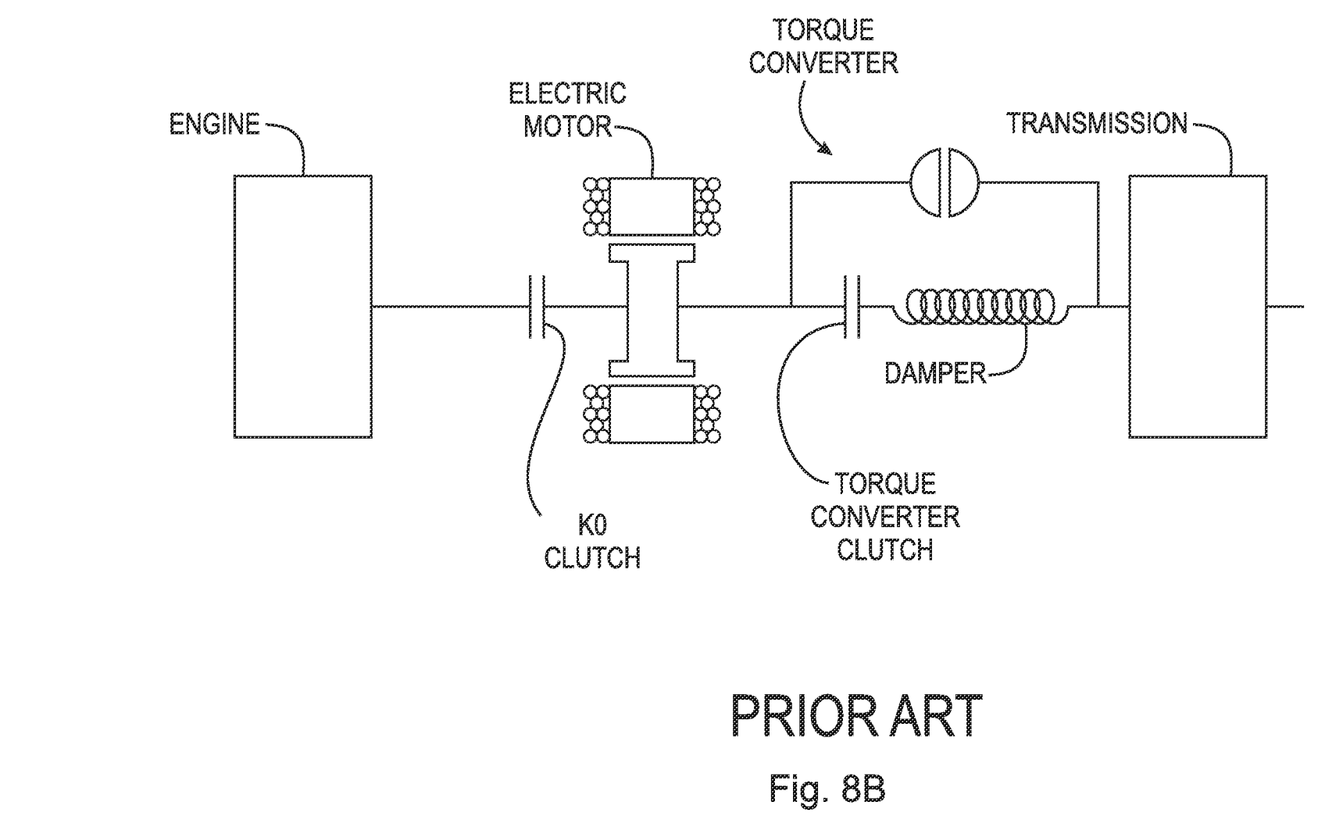

FIGS. 8A and 8B are schematic block diagrams of prior art drive trains including a hybrid drive module. U.S. Patent Application No. 2012/0258838 discloses a hybrid drive module with an electric motor and a torque converter accepting torque from an internal combustion engine and a clutch assembly to control torque at an output of the hybrid drive module. As shown in FIG. 8A, in one embodiment, a dual mass flywheel damper is placed between the hybrid drive module and the internal combustion engine and a second vibration damper is part of the torque converter. The dual mass flywheel damper increases the axial space required for the system as well the inertia for the system.

As shown in FIG. 8B, in another embodiment, there is no vibration damper between the engine and the clutch assembly. This arrangement results in increased wear for the clutch assembly, since engine vibration is transmitted directly to the clutch assembly. In particular, spline connections and clutch plates in the clutch assembly are protected from engine vibration. Further, serviceability and assembly are complicated by the fact that the electric motor and the torque converter are assembled from the same side.

U.S. Patent Applications No. 2013/0192946 and 2013/0192947 disclose one vibration damper between a hybrid drive module and an internal combustion engine and a second vibration damper, which is part of the torque converter. FIG. 8B is applicable to both of the preceding patent application publications. The discussion for the first embodiment of U.S. Patent Application No. 2012/0258838 is applicable to the foregoing patent application publications.

Figure 9:
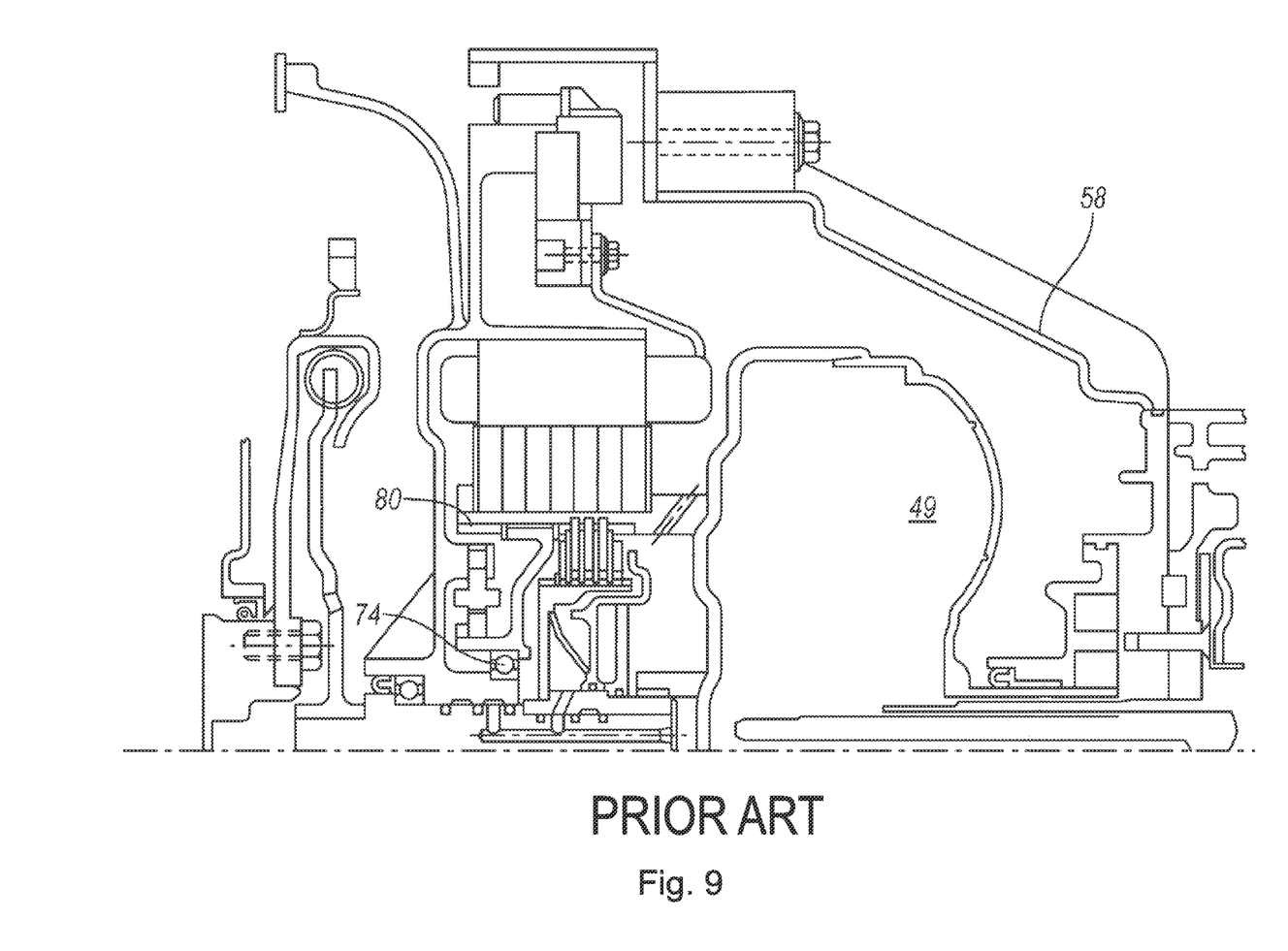

FIG. 9 is a partial cross-sectional view of a prior art drive train including a hybrid drive module. In U.S. Patent Application No. 2013/0192947, a single bearing 74 is used to position rotor carrier 80, negatively impacting the positioning of the rotor carrier. Also, torque converter 49 is in a chamber, formed by transmission housing 58 filled with fluid, increasing drag associated with operation of the torque converter. Further, if chamber 58 is tipped enough, oil collects in the right side of the chamber in FIG. 9 exposes the return inlet causing the inlet to suck air instead of oil, which results in reduced performance and even damage.

SUMMARY

According to aspects illustrated herein, there is provided a hybrid drive module, including: a torque converter with an output shaft, a cover arranged for direct connection to a flex plate arranged to receive first torque from an internal combustion engine, an impeller non-rotatably connected to the cover, a turbine in fluid communication with the impeller, and a torsional damper including an input part non-rotatably connected to the turbine, an output part non-rotatably connected to the output shaft and at least one circumferentially aligned coil spring engaged with the input part and the output part; an output hub arranged to non-rotatably connect to a transmission input shaft; and a disconnect clutch assembly including a first clutch component non-rotatably connected to the output hub and arranged to non-rotatably connect to an electric motor and a second clutch component non-rotatably connected to the output shaft. A torque path from the cover to the output hub passes through in sequence: the turbine, the damper, the output shaft, the second clutch component, and the first clutch component.

According to aspects illustrated herein, there is provided a hybrid drive module, including: a torque converter with an output shaft, a cover arranged for direct connection to a flex plate arranged to receive first torque from an internal combustion engine, an impeller non-rotatably connected to the cover, a turbine in fluid communication with the impeller, and a torsional damper including an input part non-rotatably connected to the turbine, an output part non-rotatably connected to the output shaft and at least one circumferentially aligned coil spring engaged with the input part and the output part; and a disconnect clutch assembly including a one-way clutch with first race non-rotatably connected to the electric motor and arranged to non-rotatably connect to a transmission input shaft and a second race non-rotatably connected to the output shaft. A torque path from the cover to the output hub passes through in sequence: the turbine, the damper, the output shaft, the second race, and the first race.

According to aspects illustrated herein, there is provided a hybrid drive module, including: a torque converter with an output shaft, a cover arranged for direct connection to a flex plate arranged to receive first torque from an internal combustion engine, an impeller non-rotatably connected to the cover, a turbine in fluid communication with the impeller, and a torsional damper including an input part non-rotatably connected to the turbine, an output part non-rotatably connected to the output shaft and at least one circumferentially aligned coil spring engaged with the input part and the output part; an output hub arranged to non-rotatably connect to a transmission input shaft; an electric motor; and a disconnect clutch assembly including a first clutch component non-rotatably connected to the output hub and the electric motor and a second clutch component non-rotatably connected to the output shaft. A first torque path from the cover to the output hub passes through in sequence: the turbine, the damper, the output shaft, the second clutch component, and the first clutch component.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
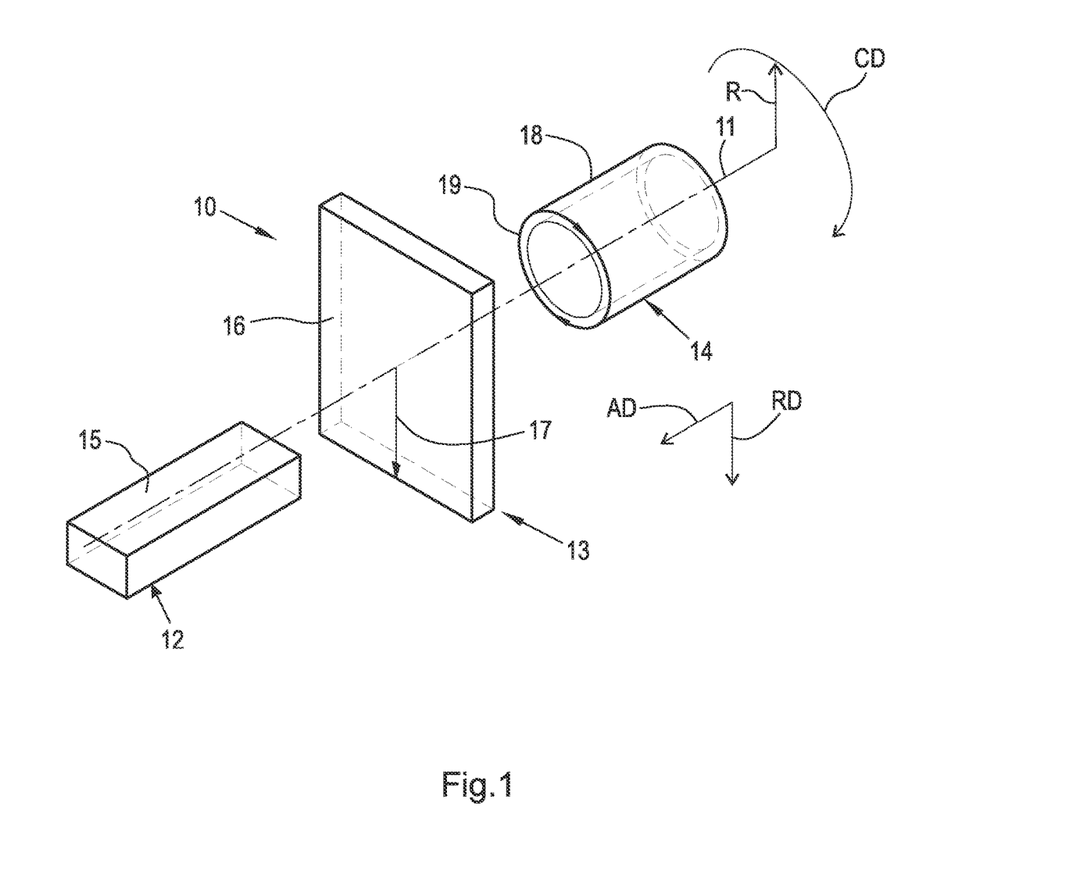
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
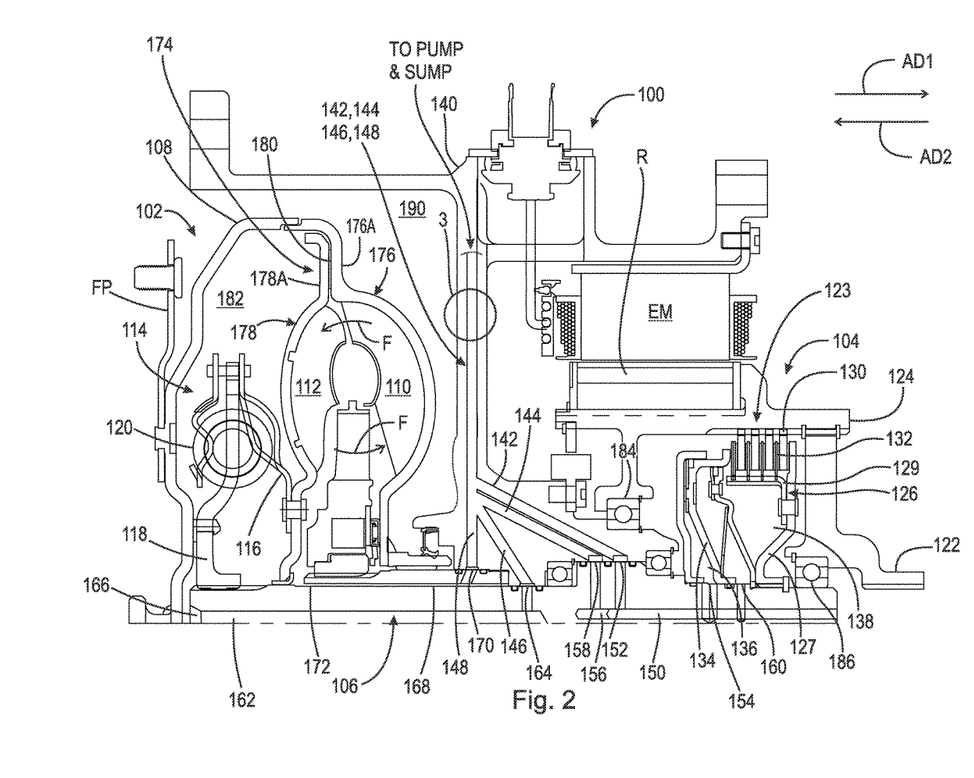
FIG. 2 is a cross-sectional view of a hybrid drive module with a single damper.

FIG. 2 is a cross-sectional view of hybrid drive module 100 with a single damper.

Figure 3:
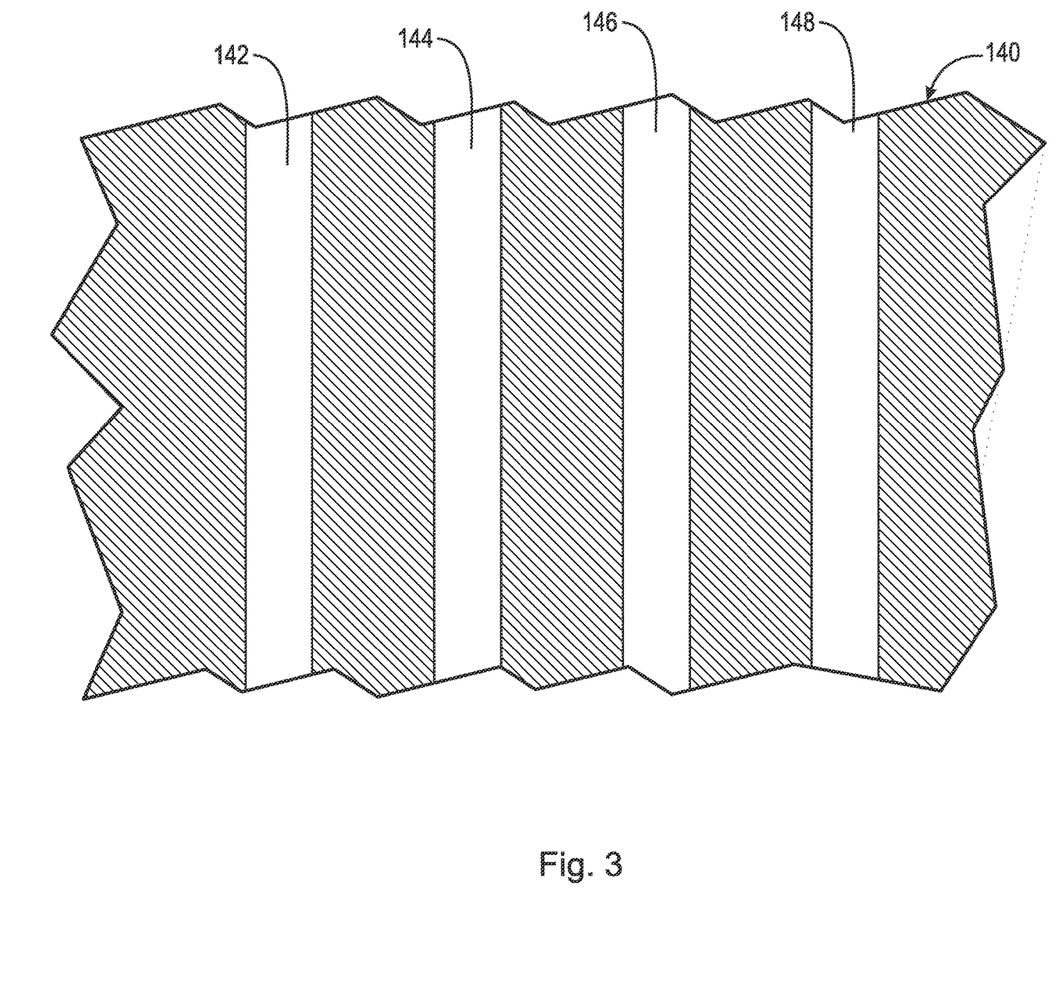
FIG. 3 is an axial cross-sectional detail of area 3 in FIG. 2, illustrating circumferentially stacked channels.

FIG. 3 is an axial cross-sectional detail of area 3 in FIG. 2, illustrating circumferentially stacked channels.

Figure 4:
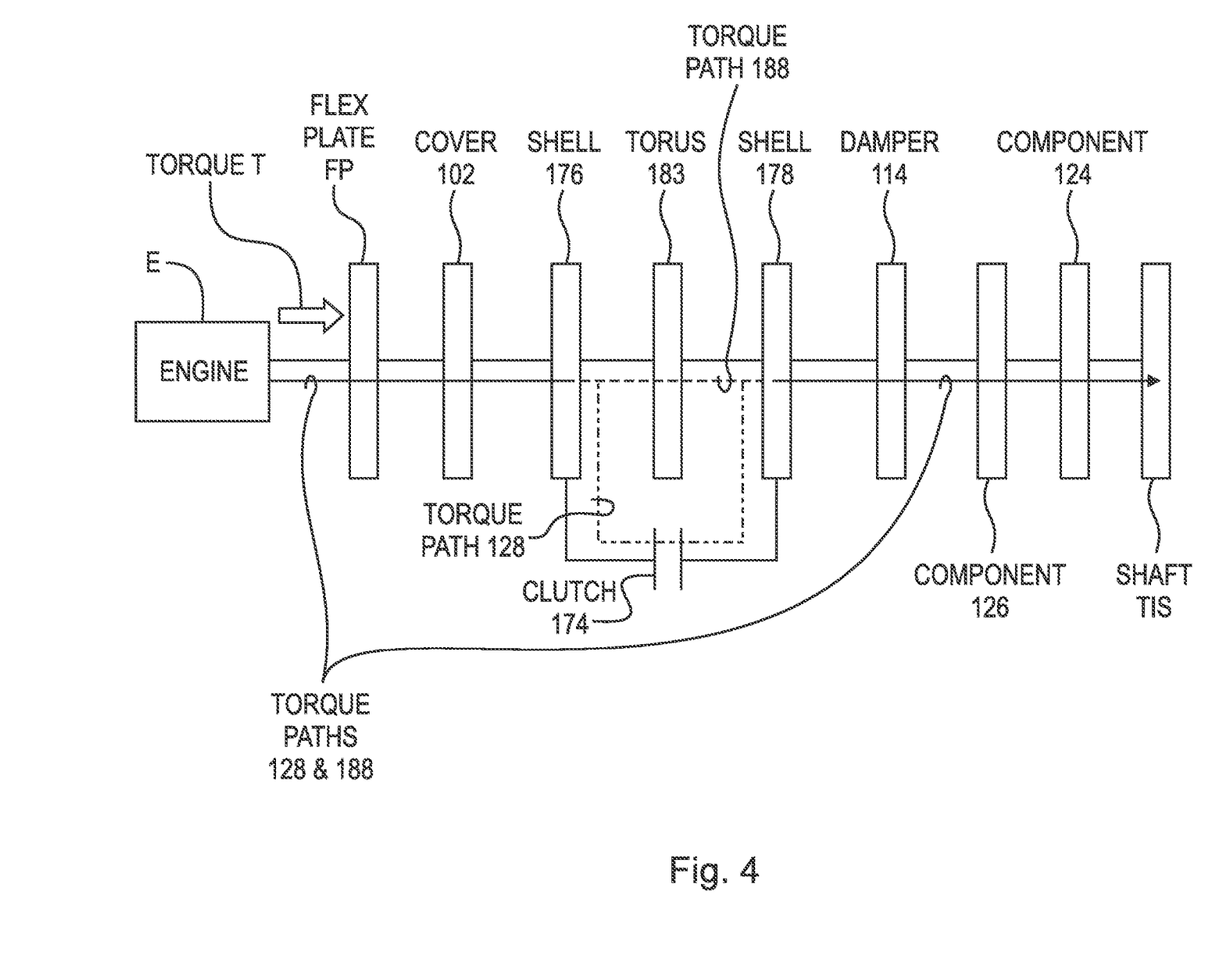
FIG. 4 is a schematic block diagram of a drive train including the hybrid drive module of FIG. 2.

FIG. 4 is a schematic block diagram of a drive train including hybrid drive module 100 of FIG. 2. The following should be viewed in light of FIGS. 2 through 4. Module 100 includes: torque converter 102, disconnect clutch assembly 104, and output shaft 106. Torque converter 102 includes cover 108, impeller 110 non-rotatably connected to cover 108, turbine 112 in fluid communication with impeller 110, and torsional damper 114. Cover 108 is arranged for direct connection to flex plate FP, which is arranged to receive torque T from internal combustion engine E. Damper 114 includes input part 116 non-rotatably connected to turbine 110, output part 118 non-rotatably connected to output shaft 106, and at least one circumferentially aligned coil spring 120 engaged with input part 116 and output part 118. Module 100 also includes output hub 122 arranged to non-rotatably connect to transmission input shaft TIS.

Disconnect clutch assembly 104 includes disconnect friction clutch 123 with clutch components 124 and 126. Component 124, also known as rotor carrier 124, is non-rotatably connected to output hub 122 and arranged to non-rotatably connect to rotor R of electric motor EM. In an example embodiment, module 100 includes motor EM. Component 126 is non-rotatably connected to output shaft 106. In an example embodiment component 126 includes hub 127 non-rotatably connected to shaft 106 and carrier 129 non-rotatably connected to hub 127. When disconnect clutch 123 is closed, torque path 128 from cover 108 to output hub 122 passes through in sequence: turbine 112, damper 114, output shaft 106, clutch component 126, and clutch component 124. In an example embodiment, assembly 104 includes at least one clutch plate 130 non-rotatably connected to component 124, at least one clutch plate 132 non-rotatably connected to component 126, and piston 134 axially displaceable to clamp clutch plates 130 and 132 to non-rotatably connect components 116 and 118.

Assembly 104 includes pressure chambers 136 and 138 at least partially bounded by piston 134. Chamber 136 is arranged to receive pressurized fluid to axially displace piston 134 in axial direction AD1 to clamp clutch plates 130 and 132, and chamber 138 is arranged to receive pressurized fluid to axially displace piston 134 in opposite axial direction AD2 to disengage clutch plates 130 and 132 to enable relative rotation between clutch components 124 and 126.

In an example embodiment, module 100 includes housing 140 axially disposed between torque converter 102 and disconnect clutch assembly 104. Housing 140 includes: channel 142 at least partially disposed in housing 140 and arranged to supply the pressurized fluid to pressure chamber 136; channel 144 at least partially disposed in housing 140 and arranged to supply the pressurized fluid to pressure chamber 138; channel 146 at least partially disposed in housing 140 and arranged to supply pressurized fluid to torque converter 102; and channel 148 at least partially disposed in housing 140 and arranged to drain fluid from torque converter 102. As shown in FIG. 3, in an example embodiment, channels 142, 144, 146, and 148 are circumferentially aligned, or stacked.

In an example embodiment, torque converter 102 includes turbine clutch 174 including portions 176A and 178A of impeller shell 176 and turbine shell 178, respectively. Frictional material 180 is disposed between portions 176A and 178A. In torque converter mode, clutch 174 is open and impeller shell 176 and turbine shell 178 are independently rotatable. Thus, torque T is transmitted to shell 176 and to shell 178 via fluid F. In lock-up mode, pressure in chamber 182 is greater than pressure in torus 183, displacing shell 178 in direction AD1 to frictionally engage portions 176A and 178A to close clutch 174. Torque T then is transmitted directly from shell 176 to shell 178 via clutch 174. In an example embodiment, torque converter 102 includes bearings 184 and 186 which position rotor carrier 124.

In an example embodiment, torque converter 102 includes turbine clutch 174 including portions 176A and 178A of impeller shell 176 and turbine shell 178, respectively. Frictional material 180 is disposed between portions 176A and 178A. In torque converter mode, clutch 174 is open and impeller shell 176 and turbine shell 178 are independently rotatable. Thus, torque T is transmitted to shell 176 and to shell 178 via fluid F. In lock-up mode, pressure in chamber 182 is greater than pressure in torus 180, displacing shell 178 in direction AD1 to frictionally engage portions 176A and 178A to close clutch 174. Torque T then is transmitted directly from shell 176 to shell 178 via clutch 174. In an example embodiment, torque converter 102 includes bearings 184 and 186 which position rotor carrier 124.

Disconnect clutch assembly 104 controls the torque provided at output hub 122. For example, when disconnect clutch 123 is open, torque can be transmitted to hub 122 from motor EM, but not from torque converter 104. When disconnect clutch 123 is closed torque from both torque converter 104 and motor EM can be transmitted to hub 122. In addition, when disconnect clutch 123 is closed, torque can be transmitted from motor EM to engine E to start engine E.

Advantageously, module 100 provides vibration protection for disconnect clutch assembly 104 with the use of only a single vibration damper 114 in torque converter 102, for example, without use of a dual mass flywheel damper. In particular, module 100 provides protection for spline connections and clutch plates. For example, the only torque paths for torque T must pass through damper 114 before reaching disconnect clutch assembly 104. Specifically, in lock-up mode for torque converter 102, torque path 128 is applicable. In torque converter mode for torque converter 102, torque path 188 is applicable. Both torque path 128 and 188 pass through damper 114 before reaching clutch assembly 104.

Module 100 provides the following further advantages:
1. Reduction of axial space required for module 100 since a vibration damper between cover 102 and engine E is not required.
2. Reduction in inertia since a vibration damper between cover 102 and engine E is not required.
3. Improved serviceability since torque converter 102 and disconnect clutch assembly 104 are assembled from different sides of module 100.
4. Improved positioning of rotor carrier 124 due to bearings 184 and 186.
5. Reduction in drag associated with torque converter 102, since chamber 190, in which torque converter 102 is located, is a dry chamber.
6. The air suction problem noted above is eliminated by the absence of a wet chamber analogous to the chamber formed by housing 58 in FIG. 8.

Figure 5:
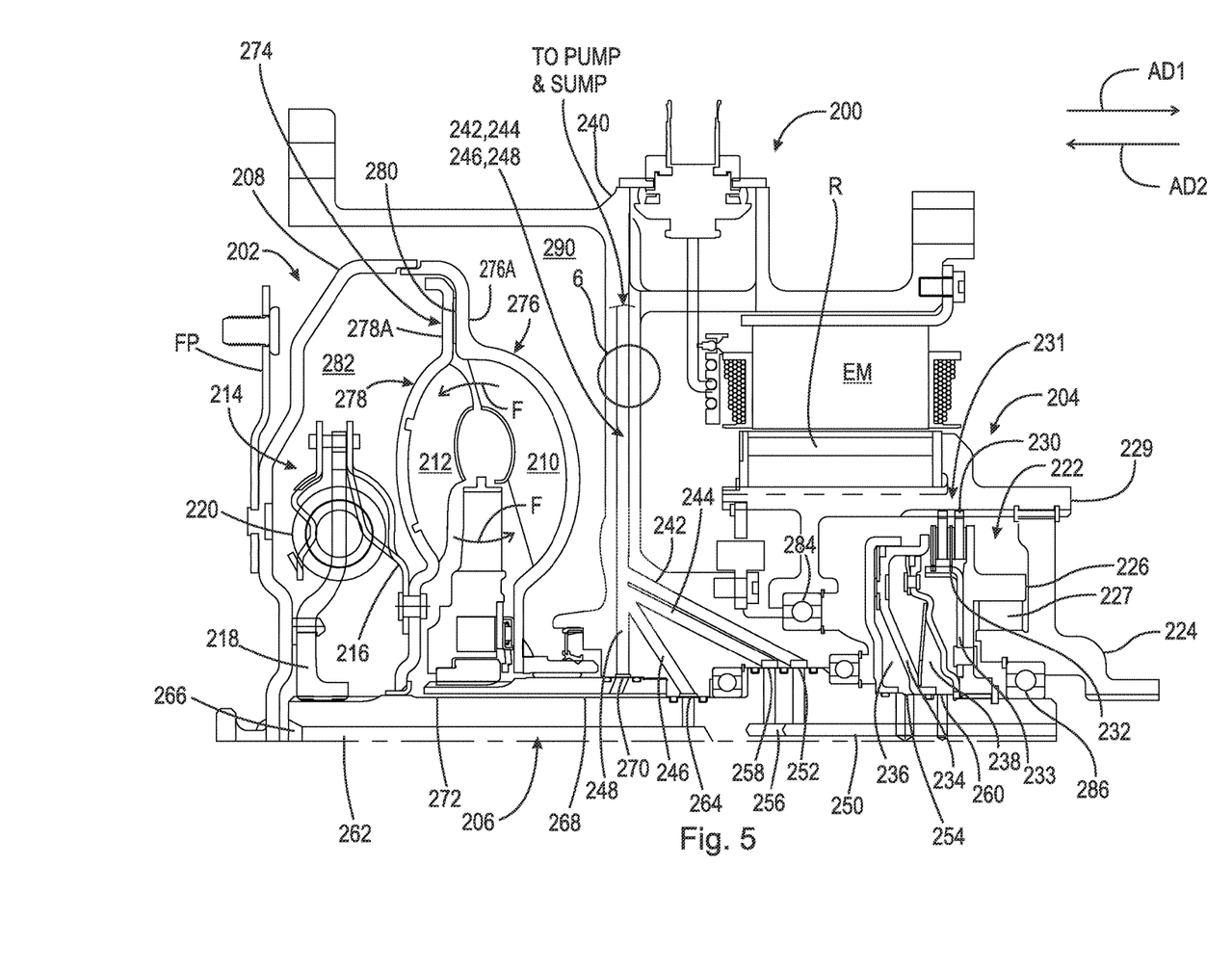
FIG. 5 is a cross-sectional view of a hybrid drive module with a single damper and a one-way clutch.

FIG. 5 is a cross-sectional view of hybrid drive module 200 with a single damper.

Figure 6:
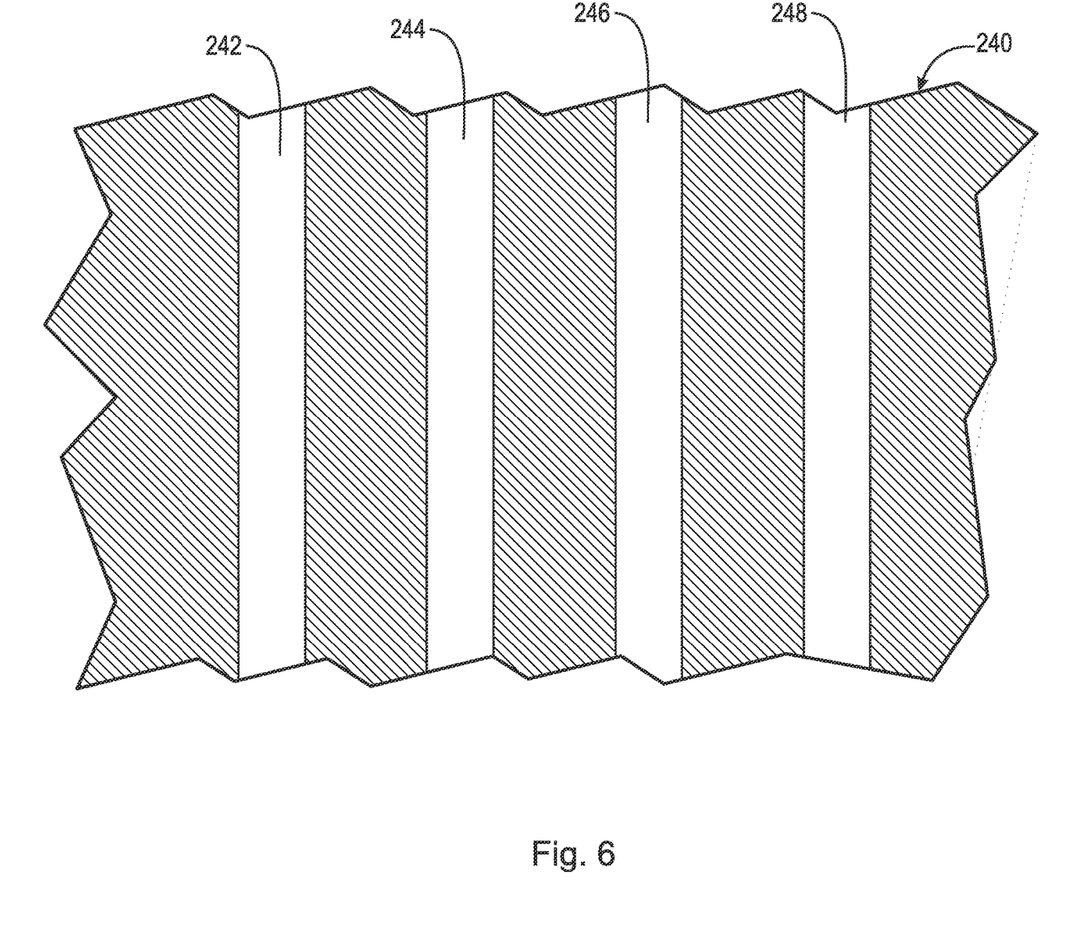
FIG. 6 is an axial cross-sectional detail of area 6 in FIG. 5, illustrating circumferentially stacked channels.

FIG. 6 is an axial cross-sectional detail of area 6 in FIG. 5, illustrating circumferentially stacked channels.

Figure 7:
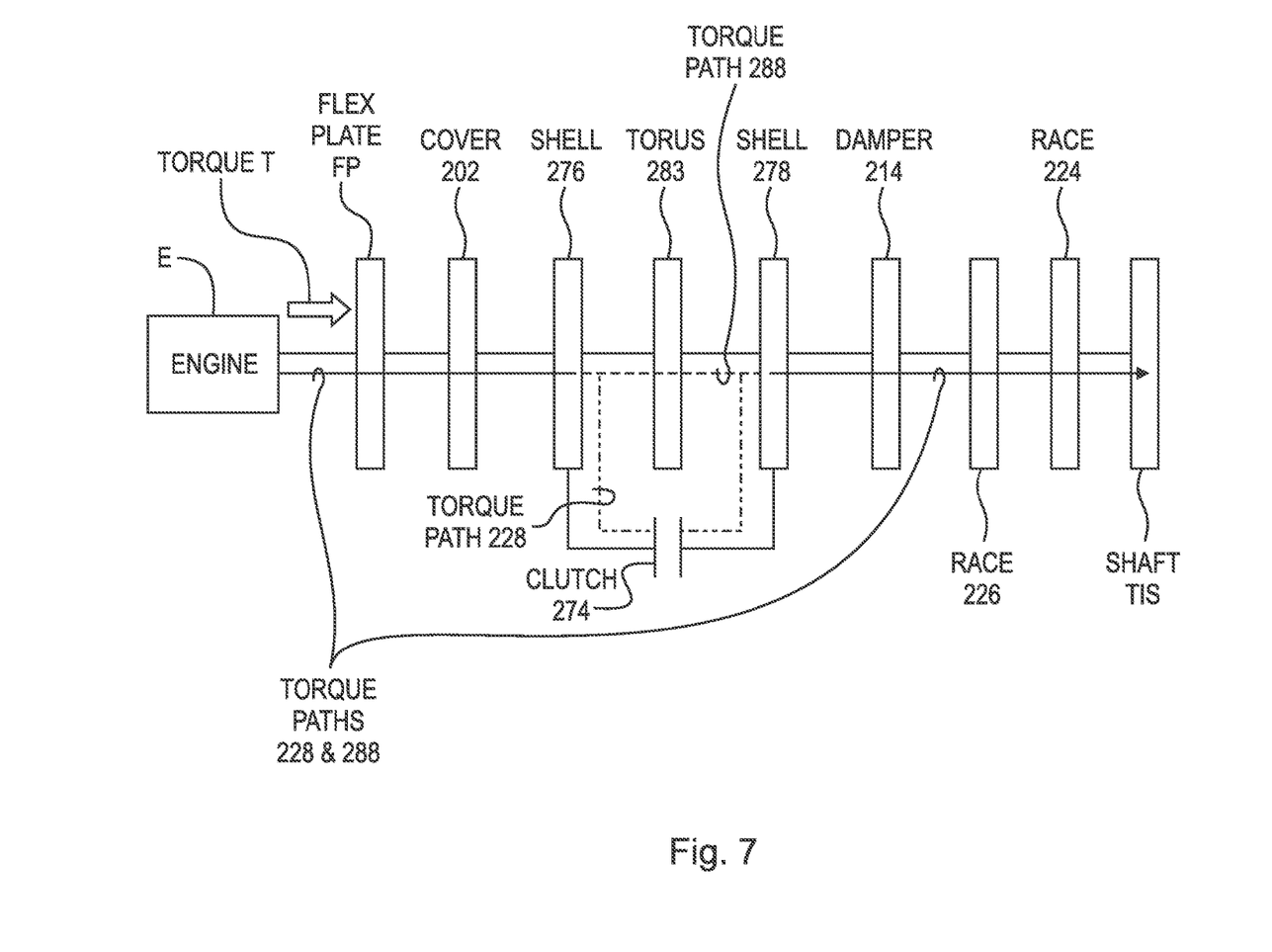
FIG. 7 is a schematic block diagram of a drive train including the hybrid drive module of FIG. 5.

FIG. 7 is a schematic block diagram of drive train including hybrid drive module 200 of FIG. 5. The following should be viewed in light of FIGS. 5 through 7. Module 200 includes: torque converter 202, disconnect clutch assembly 204, and output shaft 206. Torque converter 202 includes cover 208, impeller 210 non-rotatably connected to cover 208, turbine 212 in fluid communication with impeller 210, and torsional damper 214. Cover 208 is arranged for direct connection to flex plate FP, which is arranged to receive torque T from internal combustion engine E. Damper 214 includes input part 216 non-rotatably connected to turbine 210, output part 218 non-rotatably connected to output shaft 206, and at least one circumferentially aligned coil spring 220 engaged with input part 216 and output part 218.

Disconnect clutch assembly 204 includes one-way disconnect clutch 222 including inner race 224, outer race 226 and engagement assembly 227 used to enable relative rotation of races 224 and 226 and to non-rotatably connect races 224 and 226. Disconnect clutch 222 can be any one-way clutch known in the art, for example, any roller or sprag one-way clutch known in the art. Race 224 is the output for module 200 and is arranged to non-rotatably connect to transmission input shaft TIS. Rotor carrier 229 is non-rotatably connected to race 224 and is arranged to non-rotatably connect to rotor R of electric motor EM. In an example embodiment, module 200 includes motor EM. Race 226 is non-rotatably connected to output shaft 206. Torque path 228 from cover 208 to race 224 passes through in sequence: turbine 212, damper 214, output shaft 206, and race 226.

For relative rotation of race 224 with respect to race 226 (free-wheel mode), for example race 224 is rotating faster than race 226 or race 226 is not rotating, race 224 is rotatable with respect to race 226. In this instance, torque can be transmitted to race 224 by motor EM, but not by torque converter 204. For relative rotation of race 226 with respect to race 224 (locking mode), for example race 226 is rotating faster than race 224 or race 224 is not rotating, races 224 and 226 are non-rotatably connected. In this instance, torque can be transmitted to race 224 by motor EM and torque converter 204.

In an example embodiment, assembly 204 includes disconnect friction clutch 231 with at least one clutch plate 230 non-rotatably connected to rotor carrier 229, at least one clutch plate 232 non-rotatably connected to carrier 233, which is non-rotatably connected to race 226, piston 234 axially displaceable to clamp clutch plates 230 and 232 to non-rotatably connect races 224 and 226.

Assembly 204 includes pressure chambers 236 and 238 at least partially bounded by piston 234. Chamber 236 is arranged to receive pressurized fluid to axially displace piston 234 in axial direction AD1 to clamp clutch plates 230 and 232, and chamber 238 is arranged to receive pressurized fluid to axially displace piston 234 in opposite axial direction AD2 to disengage clutch plates 230 and 232 to enable relative rotation between races 224 and 226.

In an example embodiment, module 200 includes housing 240 axially disposed between torque converter 202 and disconnect clutch assembly 204. Housing 240 includes: channel 242 at least partially disposed in housing 240 and arranged to supply the pressurized fluid to pressure chamber 236; channel 244 at least partially disposed in housing 240 and arranged to supply the pressurized fluid to pressure chamber 238; channel 246 at least partially disposed in housing 240 and arranged to supply pressurized fluid to torque converter 202; and channel 248 at least partially disposed in housing 240 and arranged to drain fluid from torque converter 202. As shown in FIG. 6, in an example embodiment, channels 242, 244, 246, and 248 are circumferentially aligned, or stacked.

In an example embodiment, torque converter 202 includes turbine clutch 274 including portions 276A and 278A of impeller shell 276 and turbine shell 278, respectively. Frictional material 280 is disposed between portions 276A and 278A. In torque converter mode, clutch 274 is open and impeller shell 276 and turbine shell 278 are independently rotatable. Thus, torque T is transmitted to shell 276 and to shell 278 via fluid F. In lock-up mode, pressure in chamber 282 is greater than pressure in torus 283, displacing shell 278 in direction AD1 to frictionally engage portions 276A and 278A to close clutch 274. Torque T then is transmitted directly from shell 276 to shell 278 via clutch 274. In an example embodiment, torque converter 202 includes bearings 284 and 286 which position rotor carrier 224.

In an example embodiment, torque converter 202 includes turbine clutch 274 including portions 276A and 278A of impeller shell 276 and turbine shell 278, respectively. Frictional material 280 is disposed between portions 276A and 278A. In torque converter mode, clutch 274 is open and impeller shell 276 and turbine shell 278 are independently rotatable. Thus, torque T is transmitted to shell 276 and to shell 278 via fluid F. In lock-up mode, pressure in chamber 282 is greater than pressure in torus 280, displacing shell 278 in direction AD1 to frictionally engage portions 276A and 278A to close clutch 274. Torque T then is transmitted directly from shell 276 to shell 278 via clutch 274. In an example embodiment, torque converter 202 includes bearings 284 and 286 which position rotor carrier 224.

Disconnect clutch assembly 204 controls the torque provided at race 224. For example, when clutch 231 is open and clutch 222 is in free-wheel mode, torque can be transmitted to race 224 from motor EM, but not from torque converter 204. For example, when clutch 231 is closed and clutch 222 is in locking mode, torque can be transmitted to race 224 from motor EM and converter 204. In addition, when clutch 231 is closed, torque can be transmitted from motor EM to engine E to start engine E.

Advantageously, module 200 provides vibration protection for disconnect clutch assembly 204 with the use of only a single vibration damper 214 in torque converter 202, for example, without the use of a dual mass flywheel damper. In particular, module 200 provides protection for spline connections and clutch plates. For example, the only torque paths for torque T must pass through damper 214 before reaching disconnect clutch assembly 204. Specifically, in lock-up mode for torque converter 202, torque path 228 is applicable. In torque converter mode for torque converter 202, torque path 288 is applicable. Both torque path 228 and 288 pass through damper 214 before reaching clutch assembly 204.

Module 200 provides the following further advantages:
1. Reduction of the axial space required for module 200 since a vibration damper between cover 202 and engine E is not required.
2. Reduction is inertia since a vibration damper between cover 202 and engine E is not required.
3. Improved serviceability since torque converter 202 and disconnect clutch assembly 204 are assembled from different sides of module 200.
4. Improved positioning of rotor carrier 224 due to bearings 284 and 286.
5. Reduction in drag associated with torque converter 202, since chamber 290, in which torque converter 202 is located is a dry chamber.
6. The air suction problem noted above is eliminated by the absence of a wet chamber analogous to the chamber formed by housing 58 in FIG. 8.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A hybrid drive module, comprising:
   a torque converter including:
      an output shaft;
      a cover arranged for direct connection to a flex plate arranged to receive first torque from an internal combustion engine;
      an impeller non-rotatably connected to the cover;
      a turbine in fluid communication with the impeller; and,
      a torsional damper including:
         an input part non-rotatably connected to the turbine;
         an output part non-rotatably connected to the output shaft; and,
         at least one circumferentially aligned coil spring engaged with the input part and the output part;
   an output hub arranged to non-rotatably connect to a transmission input shaft; and,
   a disconnect clutch assembly including:
      a first clutch component non-rotatably connected to the output hub and arranged to non-rotatably connect to an electric motor; and,
      a second clutch component non-rotatably connected to the output shaft, wherein a torque path from the cover to the output hub passes through in sequence: the turbine, the damper, the output shaft, the second clutch component, and the first clutch component.

2. The hybrid drive module of claim 1, wherein:
   the disconnect clutch assembly includes:
      at least one first clutch plate non-rotatably connected to the first component;
      at least one second clutch plate non-rotatably connected to the second component; and,
      a piston axially displaceable to clamp the at least one first and second clutch plates to non-rotatably connect the first and second clutch components.

3. The hybrid drive module of claim 2, wherein:
   the disconnect clutch assembly includes first and second pressure chambers at least partially bounded by the piston;
   the first chamber is arranged to receive pressurized fluid to axially displace the piston to clamp the at least one first and second clutch plates; and,
   the second chamber is arranged to receive pressurized fluid to axially displace the piston to disengage the at least one first and second clutch plates to enable relative rotation between the first and second clutch components.

4. The hybrid drive module of claim 3, further comprising:
   a housing axially disposed between the torque converter and the clutch assembly;
   a first channel at least partially disposed in the housing and arranged to supply the pressurized fluid to the first pressure chamber;
   a second channel at least partially disposed in the housing and arranged to supply the pressurized fluid to the second pressure chamber;
   a third channel at least partially disposed in the housing and arranged to supply pressurized fluid to the torque converter; and, a fourth channel at least partially disposed in the housing and arranged to drain fluid from the torque converter.

5. The hybrid drive module of claim 4, wherein the output shaft includes:
a fifth channel connecting the first channel and the first pressure chamber;
a sixth channel connecting the second channel and the second pressure chamber;
a seventh channel connecting the third channel and the torque converter; and,
an eighth channel connecting the fourth channel and the torque converter.

6. The hybrid drive module of claim 1, further comprising:
a first race for a one-way clutch, the first race including the first clutch component and the output hub, wherein:
the second clutch component includes a second race for the one-way clutch;
for relative rotation of the first race with respect to the second race, the first race is rotatable with respect to the second race; and,
for relative rotation of the second race with respect to the first race, the first and second races are non-rotatably connected.

7. A hybrid drive module, comprising:
a torque converter including:
an output shaft;
a cover arranged for direct connection to a flex plate arranged to receive first torque from an internal combustion engine;
an impeller non-rotatably connected to the cover;
a turbine in fluid communication with the impeller; and,
a torsional damper including:
an input part non-rotatably connected to the turbine;
an output part non-rotatably connected to the output shaft; and,
at least one circumferentially aligned coil spring engaged with the input part and the output part; and,
a disconnect clutch assembly including a one-way clutch with:
a first race non-rotatably connected to an electric motor and arranged to non-rotatably connect to a transmission input shaft; and,
a second race non-rotatably connected to the output shaft, wherein a torque path from the cover to the second race passes through in sequence: the turbine, the damper, the output shaft, the second race, and the first race.

8. The hybrid drive module of claim 7, wherein:
for relative rotation of the first race with respect to the second race, the first race is rotatable with respect to the second race; and,
for relative rotation of the second race with respect to the first race, the first and second races are non-rotatably connected.

9. The hybrid drive module of claim 7, wherein:
the disconnect clutch assembly includes:
at least one first clutch plate non-rotatably connected to the first race;
at least one second clutch plate non-rotatably connected to the second race; and,
a piston axially displaceable to clamp the at least one first and second clutch plates to non-rotatably connect the first and second clutch components.

10. The hybrid drive module of claim 9, wherein:
the disconnect clutch assembly includes first and second pressure chambers at least partially bounded by the piston;
the first chamber is arranged to receive pressurized fluid to axially displace the piston to clamp the at least one first and second clutch plates; and,
the second chamber is arranged to receive pressurized fluid to axially displace the piston to disengage the at least one first and second clutch plates to enable relative rotation between the first and second clutch components.

11. The hybrid drive module of claim 10, further comprising:
a housing axially disposed between the torque converter and the clutch assembly;
a first channel at least partially disposed in the housing and arranged to supply the pressurized fluid to the first pressure chamber;
a second channel at least partially disposed in the housing and arranged to supply the pressurized fluid to the second pressure chamber;
a third channel at least partially disposed in the housing and arranged to supply pressurized fluid to the torque converter; and,
a fourth channel at least partially disposed in the housing and arranged to drain fluid from the torque converter.

12. The hybrid drive module of claim 11, wherein the output shaft includes:
a fifth channel connecting the first channel and the first pressure chamber;
a sixth channel connecting the second channel and the second pressure chamber;
a seventh channel connecting the third channel and the torque converter; and,
an eighth channel connecting the fourth channel and the torque converter.

13. A hybrid drive module, comprising:
a torque converter including:
an output shaft;
a cover arranged for direct connection to a flex plate arranged to receive first torque from an internal combustion engine;
an impeller non-rotatably connected to the cover;
a turbine in fluid communication with the impeller; and,
a torsional damper including:
an input part non-rotatably connected to the turbine;
an output part non-rotatably connected to the output shaft; and,
at least one circumferentially aligned coil spring engaged with the input part and the output part;
an output hub arranged to non-rotatably connect to a transmission input shaft;
an electric motor; and,
a disconnect clutch assembly including:
a first clutch component non-rotatably connected to the output hub and the electric motor; and,
a second clutch component non-rotatably connected to the output shaft, wherein a first torque path from the cover to the output hub passes through in sequence: the turbine, the damper, the output shaft, the second clutch component, and the first clutch component.

14. The hybrid drive module of claim 13, wherein a second torque path from the electric motor to the output hub passes through the first component and bypasses the torque converter.

15. The hybrid drive module of claim 13, further comprising:
a first race for a one-way clutch, the first race including the first clutch component and the output hub, wherein:
the second component includes a second race for the one-way clutch;
for relative rotation of the first race with respect to the second race, the first race is rotatable with respect to the second race; and,
for relative rotation of the second race with respect to the first race, the first and second races are non-rotatably connected.

16. The hybrid drive module of claim 15, wherein:
the disconnect clutch assembly includes:
at least one first clutch plate non-rotatably connected to the first race;
at least one second clutch plate non-rotatably connected to the second race; and,
a piston axially displaceable to clamp the at least one first and second clutch plates to non-rotatably connect the first and second races.

17. The hybrid drive module of claim 13, wherein the disconnect clutch assembly includes:
at least one first clutch plate non-rotatably connected to the first clutch component;
at least one second clutch plate non-rotatably connected to the second clutch component; and,
a piston axially displaceable to clamp the at least one first and second clutch plates to non-rotatably connect the first and second clutch components.

18. The hybrid drive module of claim 17, wherein:
the disconnect clutch assembly includes first and second pressure chambers at least partially bounded by the piston;
the first chamber is arranged to receive pressurized fluid to axially displace the piston to clamp the at least one first and second clutch plates; and,
the second chamber is arranged to receive pressurized fluid to axially displace the piston to disengage the at least one first and second clutch plates to enable relative rotation between the first and second clutch components.

19. The hybrid drive module of claim 18, further comprising:
a housing axially disposed between the torque converter and the clutch assembly;
a first channel at least partially disposed in the housing and arranged to supply the pressurized fluid to the first pressure chamber;
a second channel at least partially disposed in the housing and arranged to supply the pressurized fluid to the second pressure chamber;
a third channel at least partially disposed in the housing and arranged to supply pressurized fluid to the torque converter; and,
a fourth channel at least partially disposed in the housing and arranged to drain fluid from the torque converter.

20. The hybrid drive module of claim 19, wherein the output shaft includes:
a fifth channel connecting the first channel and the first pressure chamber;
a sixth channel connecting the second channel and the second pressure chamber;
a seventh channel connecting the third channel and the torque converter; and,
an eighth channel connecting the fourth channel and the torque converter.

* * * * *

UNITED STATES PATENT AND TRADEMARK OFFICE
CERTIFICATE OF CORRECTION

PATENT NO. : 9,709,147 B2  
APPLICATION NO. : 14/847774  
DATED : July 18, 2017  
INVENTOR(S) : Steinberger et al.

Page 1 of 1

It is certified that error appears in the above-identified patent and that said Letters Patent is hereby corrected as shown below:

In the Claims

Column 8, Line 37, "the first component;" should read --the first clutch component;--

Column 8, Line 39, "the second component" should read --the second clutch component--

Column 10, Line 66, "the first component" should read --the first clutch component--

Column 11, Line 5, "the second component" should read --the second clutch component--

Signed and Sealed this  
Thirty-first Day of December, 2019

Andrei Iancu  
*Director of the United States Patent and Trademark Office*